April 17, 1951 G. H. HOWE 2,549,469
MAGNETIC SOUND RECORDING MEDIUM
Filed Dec. 16, 1947
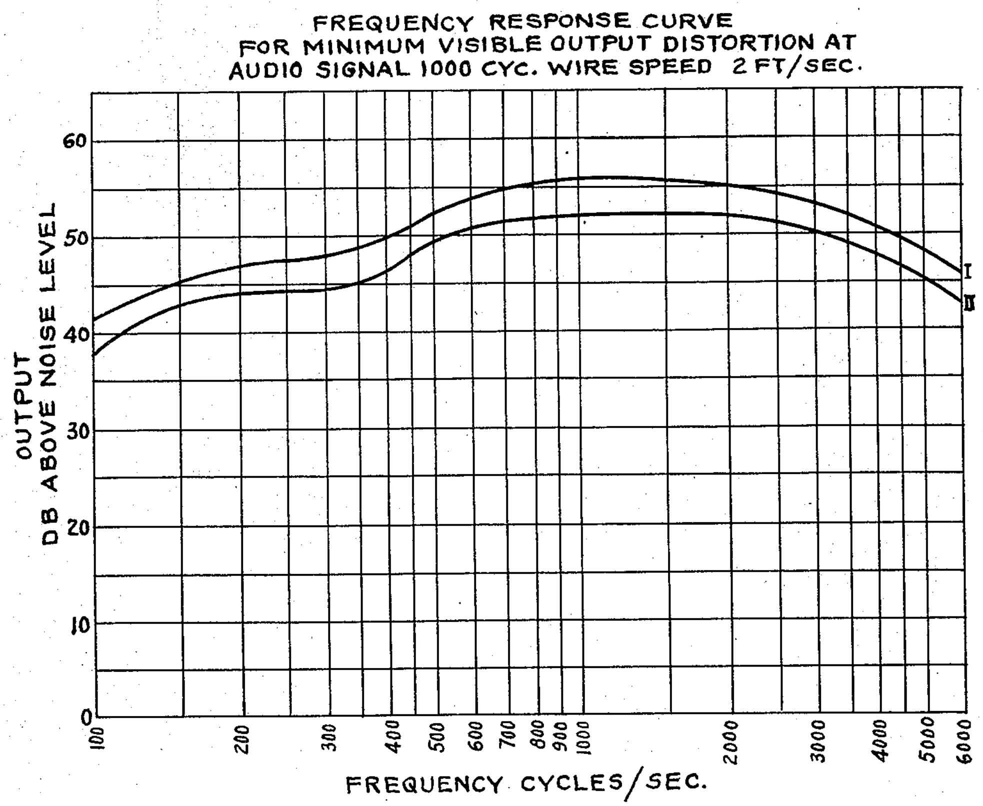
Inventor:
Goodwin H. Howe,
by [signature]
His Attorney.

Patented Apr. 17, 1951 2,549,469

UNITED STATES PATENT OFFICE 2,549,469

MAGNETIC SOUND RECORDING MEDIUM

Goodwin H. Howe, Schenectady, N. Y., assignor to General Electric Company, a corporation of New York Application December 16, 1947, Serial No. 792,048

3 Claims. (Cl. 148—12.7)

The present invention relates to an improved metallic medium for magnetically recording and reproducing sound and to a process for producing such a medium.

Recent refinements in instruments for recording and reproducing sound by magnetic means have led to increased research to develop a medium for such recording and reproducing, the qualities of which will be comparable to the other improved features of the machine in which it is to be used.

In those cases in which the recording and reproducing medium is in the form of an elongated metallic member such as a wire or tape, the characteristics of primary importance are good frequency response, low noise level, adequate tensile strength under operating conditions and corrosive-resisting ability.

It is an object of the present invention to provide a magnetic sound recording and reproducing medium which possesses a favorable combination of the above qualities.

A further object is to provide a method of producing a magnetic sound recording and reproducing medium of high quality.

Another object of the invention is to provide a method of working and heat treating a copper-nickel-iron alloy to produce therefrom an efficient magnetic sound recording and reproducing medium.

Other objects will become apparent from a consideration of the following description and the drawing in which the single figure shows the improved frequency response characteristics of wire treated by the process described herein as compared with wire treated by a prior art method.

Certain copper-nickel-iron alloys possess magnetic qualities which recommend their use as sound recording and reproducing media. For example, it was known heretofore that an alloy containing 60% copper, 20% nickel and 20% iron could be cold worked with intermediate aging at a temperature of about 600° C., to a wire having a diameter of about .004 inch and that such a wire, which may or may not be subjected to a subsequent heat treatment, would provide a magnetic sound recording and reproducing medium of favorable characteristics.

The present invention is based on the discovery that if the alloy of about 60% copper, 20% nickel, and 20% iron, be given an over-aging heat treatment at a point in the cold reduction somewhat above the final dimension of about .004 inch with no heat treatment after the final cold reduction, there is obtained a magnetic sound recording and reproducing medium of superior qualities.

More specifically it has been found that if a wire about .050 inch in diameter consisting of an alloy of about 60% copper, 20% nickel and 20% iron, which has been treated to develop optimum permanent magnetic qualities and which is reduced in a series of cold working steps with intermediate heat aging at 600° C. to a final dimension of about .004, is given an overaging heat treatment at 700° C. at a diameter ranging from .008 inch to .020 inch, preferably from .012 inch to .015 inch, a sound recording and reproducing medium with superior frequency response, low noise level and good strength is produced.

As is known in the art the optimum permanent magnetic qualities in an alloy of this type are developed by recrystallizing the metallic structure, cold working to reduce the cross-sectional area about 90%–96% and heat aging for about one hour at a temperature of about 600° C.

In the practice of this invention, it is preferred to use as a starting material a wire about .050 inch in diameter in which have been developed optimum permanent magnetic qualities. Such a wire may be produced by cold working a properly prepared and recrystallized larger wire, about 90%–96% to the .050 inch diameter. The .050 inch diameter is not a critical dimension but is chosen because of its convenient size and the fact that at such a diameter the more severe cold working to which the material is subjected imparts to it superior magnetic qualities. A suitable starting wire may be prepared by cold reducing an ingot of an alloy containing about 60% copper, 20% nickel, and 20% iron (plus the usual small amounts of impurities, such as silicon and manganese) about one and one-quarter inches in diameter in a number of steps with intermediate heat treatment. For example, the ingot is cold reduced, to about a .930 inch diameter, recrystallized, and further reduced to about a .250 inch diameter and again recrystallized before cold reducing about 96% to a diameter of about .050 inch. During this final cold reduction, the wire is heat treated for about one hour at 600° C. at about .162 inch to relieve mechanical stress and again at .050 inch to relieve stress and any fibrous structure which may have developed.

Employing such a wire .050 inch in diameter and having optimum favorable magnetic characteristics, the wire is cold reduced to an intermediate diameter of from .008 inch to .020 inch and preferably from .012 inch to .015 inch at which stage the wire is subjected to an overaging heat treatment for about one hour at 700° C. It is then cold worked to about .004 inch with no subsequent heat treatment.

The resulting wire is characterized by a high frequency response, a high undistorted output level and a low noise level. As will be seen in the drawing which is a plot of frequency response for minimum visible output distortion at audio signal of 1000 cycles versus frequency in cycles per second at a wire speed of two feet per second, a wire of the present invention overaged at .012 inch and represented by curve I affords an improvement over a prior art wire such as that represented by curve II which is similar in all respects except that it was cold reduced from .050 inch to .004 inch with no intermediate overaging heat treatment in the .008 inch to .020 inch range but was heat treated at the final dimension. The frequency response of the wire overaged between .050 inch and .004 inch according to the present invention is from two to four decibels higher over the test range of 100 to 6000 cycles or 5% to 8% greater than wire of the above cited prior art which has not been so treated. The breaking strength of wire given the present treatment is about 185,000 p. s. i. which is an improvement of about 15% over wire drawn from .050 inch to .004 inch and then heat treated as taught in the prior art.

When the high comparative recording and reproducing qualities and good strength of the wire produced by the present process are considered, it will be seen that there is presented a medium with wide possible application in its field.

What I claim as new and desire to secure by Letters Patent of the United States is:

1. The method of producing a sound recording and reproducing wire which comprises cold working a recrystallized wire containing 60% copper, 20% nickel and 20% iron to obtain about 90% to 96% reduction in cross sectional area to a dimension of about .050 inch, aging the cold worked wire at 600° C. for about one hour, cold working the aged wire to a diameter of .008 inch to .020 inch, overaging the resultant wire at 700° C. for about one hour, and further cold working the overaged wire to about an .004 inch diameter.

2. The method of producing a sound recording and reproducing wire which comprises cold working a recrystallized wire containing 60% copper, 20% nickel and 20% iron to obtain about 90% to 96% reduction in cross sectional area to a dimension of about .050 inch, aging the cold worked wire at 600° C. for about one hour, cold working the aged wire to a diameter of .012 inch to .015 inch, overaging the resultant wire at 700° C. for about one hour, and further cold working the overaged wire to about an .004 inch diameter.

3. A magnetic sound recording and reproducing wire of about 0.004 inch in diameter, said wire having been obtained by cold working a recrystallized wire of an alloy of 60% copper, 20% nickel, and 20% iron to reduce the cross sectional area thereof about 90 to 96% to a diameter of about 0.050 inch, aging the cold worked wire at 600° C. for about one hour, cold working the aged wire to reduce the diameter thereof to from 0.008 to 0.020 inch, overaging the resultant wire at 700° C. for about one hour, and finally cold working the overaged wire to reduce the diameter thereof to about 0.004 inch.

GOODWIN H. HOWE.

REFERENCES CITED

The following references are of record in the file of this patent:

UNITED STATES PATENTS

| Number | Name | Date |
|---|---|---|
| 1,801,150 | Goldschmidt et al. | Apr. 14, 1931 |
| 1,987,468 | Dahl et al. | Jan. 8, 1935 |

FOREIGN PATENTS

| Number | Country | Date |
|---|---|---|
| 426,625 | Great Britain | Apr. 1, 1938 |

OTHER REFERENCES

"Alloys of Nickel and Iron," by Marsh, pages 306–307, 1938.